(12) United States Patent
Grebenschikov et al.

(10) Patent No.: US 9,912,553 B1
(45) Date of Patent: Mar. 6, 2018

(54) METHOD FOR PROVISIONING DOMAIN MODEL OF APPLICATIONS RESOURCES USING SEMANTIC ANALYSIS OF LINKS

(71) Applicant: Parallels IP Holdings GmbH, Schaffhausen (CH)

(72) Inventors: Vladimir Grebenschikov, Moscow (RU); Timur Nizametdinov, Moscow (RU); Vladimir Zatsepin, Moscow (RU); Evgeny Uspenskiy, Moscow (RU); Maxim Kuzkin, Moscow (RU); Elena Sidorova, Novosibirsk (RU); Stepan Anohin, Novosibirsk (RU); Irina Kononenko, Novosibirsk (RU); Natal'ya Salomatina, Novosibirsk (RU)

(73) Assignee: Parallels IP Holdings GmbH, Schaffhausen (CH)

( * ) Notice: Subject to any disclaimer, the term of this patent is extended or adjusted under 35 U.S.C. 154(b) by 129 days.

(21) Appl. No.: 14/733,138

(22) Filed: Jun. 8, 2015

(51) Int. Cl.
*H04L 15/16* (2006.01)
*H04L 12/24* (2006.01)
(Continued)

(52) U.S. Cl.
CPC .......... *H04L 41/5054* (2013.01); *H04L 67/10* (2013.01); *G06F 17/212* (2013.01)

(58) Field of Classification Search
CPC ......... H04L 41/12; H04L 41/20; H04L 41/50; H04L 41/0843; H04L 41/0883;
(Continued)

(56) References Cited

U.S. PATENT DOCUMENTS

| | | | | |
|---|---|---|---|---|
| 6,496,850 B1* | 12/2002 | Bowman-Amuah | . | G06F 9/4435 707/999.102 |
| 8,108,389 B2* | 1/2012 | Bobick | ............... | G06F 17/2795 704/9 |

(Continued)

OTHER PUBLICATIONS

Arnold W, Eilam T, Kalantar M, Konstantinou AV, Totok A. Pattern based SOA deployment. InICSOC Sep. 17, 2007 (vol. 4749, pp. 1-12).*

(Continued)

*Primary Examiner* — Ranodhi Serrao
*Assistant Examiner* — James Fiorillo
(74) *Attorney, Agent, or Firm* — Bardmesser Law Group (57) ABSTRACT

A method for provisioning application resources using semantic links is provided. Each application is divided into a set of separate resources corresponding to business logic linked to each other by semantic links. The application is configured based on user requirements. The provider assembles an application provisioning package, including creating a Virtual Environment (e.g., VM) on a customer site and launching an application instance on the VM based on required configuration determined by application resources and the semantic links required by these resources. A provisioning algorithm is implemented as a hierarchical tree. A root tree resource (object) is created. All relationships (semantic links) are determined. Existing linked objects are found and not yet existing ones are determined. The tree branch is created not further than one a link from a non-existent object. The leaf nodes of the tree are existing objects or objects that do not have the required links.

14 Claims, 7 Drawing Sheets

(51) Int. Cl.
*H04L 29/08* (2006.01)
*G06F 17/21* (2006.01)

(58) Field of Classification Search
CPC ............. H04L 41/5054; H04L 41/5077; G06F 17/212; G06F 17/2795; G06F 17/30303; G06F 17/30427; G06F 17/30934
USPC ........................................ 709/223, 224, 226
See application file for complete search history.

(56) References Cited

U.S. PATENT DOCUMENTS

| | | | | |
|---|---|---|---|---|
| 8,843,921 | B1* | 9/2014 | Protassov | G06F 9/44505 717/178 |
| 9,253,206 | B1* | 2/2016 | Fleischman | H04L 63/1458 |
| 9,455,876 | B1* | 9/2016 | Grebenschikov | H04L 41/20 |
| 2006/0059253 | A1* | 3/2006 | Goodman | G06Q 10/06 709/223 |
| 2008/0141240 | A1* | 6/2008 | Uthe | G06F 8/61 717/174 |
| 2009/0089078 | A1* | 4/2009 | Bursey | G06Q 10/101 705/300 |
| 2009/0177777 | A1* | 7/2009 | Behrendt | G06F 17/30734 709/226 |
| 2010/0031247 | A1* | 2/2010 | Arnold | G06F 8/61 717/174 |
| 2011/0041006 | A1* | 2/2011 | Fowler | G06F 9/466 714/10 |
| 2011/0208941 | A1* | 8/2011 | Gill | G06F 3/06 711/170 |
| 2013/0111034 | A1* | 5/2013 | Upadhya | G06F 3/0605 709/226 |
| 2013/0145375 | A1* | 6/2013 | Kang | G06F 21/53 718/104 |
| 2013/0339510 | A1* | 12/2013 | Douglas | H04L 41/5077 709/223 |
| 2014/0019597 | A1* | 1/2014 | Nath | H04L 41/0843 709/220 |
| 2014/0059178 | A1* | 2/2014 | Dutta | H04L 41/0883 709/219 |
| 2014/0129719 | A1* | 5/2014 | Weber | H04L 47/823 709/226 |
| 2014/0280952 | A1* | 9/2014 | Shear | H04L 47/70 709/226 |
| 2014/0280961 | A1* | 9/2014 | Martinez | H04L 41/5054 709/226 |
| 2014/0289391 | A1* | 9/2014 | Balaji | H04L 43/04 709/224 |
| 2015/0088841 | A1* | 3/2015 | Fuglsang | G06F 17/30303 707/692 |
| 2015/0220553 | A1* | 8/2015 | Poon | G06F 17/30427 707/722 |
| 2015/0234639 | A1* | 8/2015 | Allsbrook | G06F 8/35 717/104 |
| 2015/0304175 | A1* | 10/2015 | Maes | G06F 8/70 709/226 |
| 2015/0310124 | A1* | 10/2015 | Ben-Aharon | G06F 17/248 715/205 |
| 2015/0324182 | A1* | 11/2015 | Barros | G06F 8/61 717/174 |
| 2015/0355946 | A1* | 12/2015 | Kang | G06F 9/5072 718/104 |
| 2016/0006629 | A1* | 1/2016 | Ianakiev | G06F 21/32 709/224 |
| 2016/0072899 | A1* | 3/2016 | Tung | H04L 41/12 709/223 |
| 2016/0149769 | A1* | 5/2016 | Joshi | H04L 41/5006 715/739 |

OTHER PUBLICATIONS

Service Oriented Computing—ISOC 2007 Bernd, J. Kramer et .al Sep. 2007.*

* cited by examiner

METHOD FOR PROVISIONING DOMAIN MODEL OF APPLICATIONS RESOURCES USING SEMANTIC ANALYSIS OF LINKS

BACKGROUND OF THE INVENTION

Field of the Invention

This invention relates to a method for provisioning to generate consistent business logic or a domain model for application resources using semantic analysis of links between resources.

Description of the Related Art

Applications that conform to the Application Packaging Standard (APS) are typically installed by a provider on for customer upon request, including the applications' versions and deployment parameters that should conform to usability and security requirements. A description of requirements of the execution environment is needed in order to install complex enterprise applications corresponding to needs of a particular user. Then, the execution environment is configured and the application is installed, provided that compliance of interfaces of the execution environment and of the application is achieved. In some cases, the execution environment is determined and the application needs to be configured in order to comply with the execution environment.

A modern trend of software usage presents some challenges with regard to describing execution requirements of the applications or sets of applications that are not adequately described in specification documents, but may be simply connected to almost any cloud service. This presents a problem since complex software products may need to be deployed in different real or even virtual software execution environments residing on multiple hardware nodes having various configuration parameters.

The software products should preferably have clear and comprehensive configuration rules and definitions in terms of connection and interaction of all of the components within and outside the software product. Additionally, each of the components has to be configured based on requirements of an Operating System, network configurations, an execution environment and a hosting provider security requirements and other configuration parameters. A typical deployment guide of such a product (e.g., PARALLELS® Automation) consists of hundreds of pages of instructions that should be followed in order to create a suitable deployment environment.

Accordingly, a method for optimized automated installation of applications in a provider's infrastructure that solves all of the configuration issues is desired

SUMMARY OF THE INVENTION

Accordingly, the present invention is related to a method for provisioning application resources using semantic analysis of links that substantially obviates one or more of the disadvantages of the related art.

In another embodiment, a method for provisioning application resources using semantic links is provided. Each application is divided into a set of separate "resources" corresponding to a business logic linked to each other by the semantic links. The application is configured based on user requirements. The provider assembles an APS application provisioning package. The provisioning includes creating a Virtual Environment (e.g., VM) on a customer site and launching an application instance on the VM based on the required configuration determined by application resources and the semantic links required by these resources.

In one aspect of the invention, an application provisioning algorithm is implemented as a hierarchical tree. A root tree resource (object) is created. Then, all relationships (semantic links) are determined. The existing linked objects are found and not yet existing ones are determined. The tree branch is created not further than one a link from a non existing object. The leaf nodes of the tree are the existing objects or the objects that do not have the required links. Once the algorithm reaches the edge of the tree, checking if all the connectors satisfy the requirements may be performed. If yes, the system is implemented on the hoster's facilities or may be rearranged in the opposite case.

Moving back up the tree, the physical objects can be created, if they did not exist previously. Thus, the object that satisfies the dependencies can now be given to a customer. Once the entire tree graph is provisioned, it can be provided to the customer to be used Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

The present invention is directed to a method for the present invention is related to a method for deploying and testing application environments using semantic links. The following definitions are used throughout the description.

VEE—Virtual Execution Environment, a type of environment that supports program code execution, where at least a part of the real hardware and software required for running program code are presented as their virtual analogs. From the point of view of the user, the code in VEE runs as if it were running on the real computing system.

VM—Virtual Machine, a type of an isolated Virtual Execution Environments running on the same physical machine simultaneously. Each Virtual Machine instance executes its own OS kernel. Support of Virtual Machines is implemented using a Virtual Machine Monitor and/or a Hypervisor.

Virtual Private Server (VPS), is one type of a Virtual Execution Environment (VEE) running on the same hardware system with a single shared OS kernel and sharing most of the system resources, where isolation of Virtual Execution Environments is implemented on the namespace level. A Virtual Private Server (VPS), often referred to as "container," is a closed set, or collection, of processes, system resources, users, groups of users, objects and data structures. Each VPS has its own ID, or some other identifier, that distinguishes it from other VPSs. A container acts as an isolated virtual server within a single machine, where multiple sets of application services are organized on a single hardware node by placing each into an isolated virtual container.

The VPS/container offers to its users a service that is functionally substantially equivalent to a standalone server with a remote access. From the perspective of an administrator of the VPS, the VPS should preferably act the same as a dedicated computer at a data center. For example, it is desirable for the administrator of the VPS to have the same remote access to the server through the Internet, the same ability to reload the server, load system and application software, authorize VPS users, establish disk space quotas of the users and user groups, support storage area networks (SANs), set up and configure network connections and web servers, etc.

In other words, the full range of system administrator functions is desirable, as if the VPS were a dedicated remote server, with the existence of the VPS being transparent from the perspective of both the VPS user and the VPS administrator.

A VEE, according to an exemplary embodiment, can be any of a Virtual Private Server, a Virtual Machine, a Hypervisor-based Virtual Machine, and a Lightweight Hypervisor-based Virtual Machine, a session of Terminal Server Windows 2003 (and later or older) and a session of Citrix Presentation Server, Lightweight Hypervisor-based Virtual Machines, VMM-based VMs or hypervisor-based VMs.

Application Packaging Standard (APS) see http:**en-.wikipedia.org/wiki/Application_Packaging_Standard.

Figure 1:
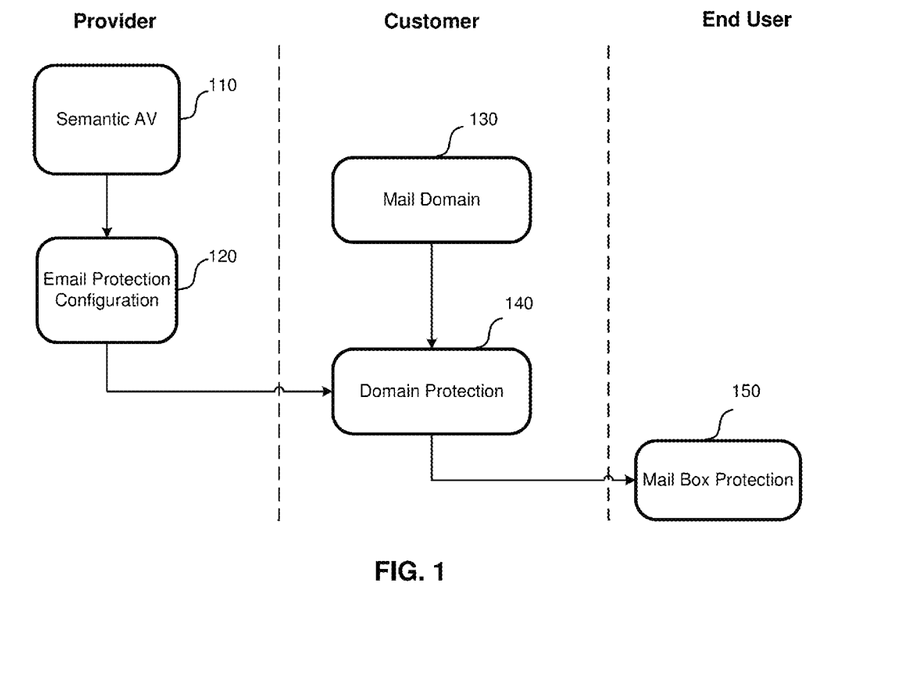
FIG. 1 illustrates an example of resource provisioning, in accordance with the exemplary embodiment.

Each application, according to Application Packaging Standard (APS), carries some business concept within it. This application business logic is represented as resource diagram in the APS (for example, a semantic antivirus (AV) application). FIG. 1 illustrates an example of resource provisioning, in accordance with the exemplary embodiment. The provider installs a semantic AV resource 110 on its site. Then, the provider can sell the AV application of certain configurations to its customers. The provider creates another resource called "email protection configuration" 120. This way, the AV application can have several configurations offered to customers.

If the customer needs a resource (service) 140 for protection of his mail service 130, the protection may be performed according to any of the AV applications 120 that are available to be provisioned. As a result, the end user receives mail box protection 150.

In the proposed system, services for servicing applications and the application itself are completely independent from each other to the moment of provisioning. The service provider can have several anti-malicious software products of different configurations for different application environments. If a user is in a process of installing an application, the provider tries to determine which type of AV protection is more suitable for the user based on the application interfaces and the user requirements description. The exemplary embodiment is most beneficial when the user application has a generalized connector "protection." As a less effective example, the provider may try to connect the protection (AV) software to the user application and check if the result is positive. In this case the most comprehensive solution in terms of different services will work as a rule.

According to one embodiment, the more effective solution is to provide semantic analysis of "protection" connector, where the protection connector may have relations with a mail client, a web-server or an ftp server resource connector. Depending on required services and complexity of the servers, the corresponding connector or group of connectors can be chosen. For example, web server servicing should be protected against DoS attracts, mail services against spam, etc. A user application with a complex integration of services should be protected by a solution or by a plurality of solutions. In the latter case, an automatic approach where connectivity and coincidence is checked by sequential attempts may not work. However, a semantic analysis approach used with replacing the connectors by topological nodes can detect the problem and produce the best solution. Three or even more nodes can be joined into one to satisfy all the requirements both formal and informal. The informal requirements may be produced by other topological nodes associated with the node of interest.

According to the exemplary embodiment, semantic analysis of the AV package, connections and the application environment can be performed consequently in hierarchical manner. In the first path all the connectors being certainly identified are connected to coincident connectors or the software. Here "connection to MySQL" has a priority over "connection to any database" and may be finally specified on the first step. The next step deals with more fuzzy definitions, for example "connection to any database." But if MySQL had been already connected on the previous iteration, this database will have the priority, for example, for simplification of system topology. At the next optional step the less defined connections are established.

As illustrated by below mentioned analytic expressions, detecting coincidence of connectors for provisioning is performed by semantic analysis of connector environment based on the level of dependency.

As and illustrative example, the connectors are considered as "nodes" that should overlap with one or more coincident nodes of another resource(s) to satisfy requirements of nodes' description and resources functionality. Other connectors or functionalities of resources are considered as nodes connected to other nodes by links. The more links are placed between the nodes, the less important are the relationships between these nodes.

As an example, the functional distance may be close to infinity. If there are no available resources that coincide with user requirements, the semantic analysis of the entire World Wide Web may be used to detect available and suitable resources for. If a suitable resource is found, the required connection overhead is calculated and if it is possible to connect the resource to chosen connector the resource is applied to a provisioning model. The overhead can be a resource price or the time required for remodeling interface to certain requirements. Another option is a "group operation" where the user requires a single or simple connector for connecting a "group of end users" and a "group of resources." The feature may be used to simplify sharing resources among single entities or several end users.

In some cases, a certain "end user" may want to be connected to a specific resource. The proposed provisioning model provides a possibility to connect specified resource over a "shared connector." Another option is a "vector representation" of a semantic model, where each connector has specific coordinates in an N-dimensional space. N may be defined as a set of parameters available in the system plus a number of functions or resources for treating these parameters. Here, positive direction may reflect requirements and negative direction may reflect satisfaction of the requirement, correspondingly. When the resulting vector of the overlapping connectors is zero, the provisioning considered finalized.

In an exemplary model, the connector is defined by a set of resource-parameter pairs. For provisioning purposes any transition leading to a required point is considered possible. The shortest way can be considered as the most possible. For example, when a mail client is connected and the application requires protection against spam and also an anti-virus, certain e-mail message may be considered as malicious by result of the message parsing or by finding the message in the "spam list." If any of the resources inside the user environment are connected to a sort of a global "spam list," this connection is used as preferable for other resources while provisioning. On the contrary, if the provider checks each incoming message or IP packet, malware notifications from the provider may be used instead of connecting to an anti-virus software license. In other words, each resource or an application can have hidden connectors that can be used in an unusual way and resources that can be used in an interconnected manner.

The connection description and the connection environment can be represented by a sentence or a phrase. In another embodiment, the package (AV, spam filter, etc.) fits to a particular application and this package is connected. After the connection is configured, the related connections (not yet implemented) can be subjected to a semantic analysis.

According to the exemplary embodiment, each application is represented by a set of resources that can be provided to a customer separately and so requires separate support from the service provider environment. These resources reflect the business logic or a part of a domain model. Each resource has its parameters and properties, connections with other resources, resource functionality, etc. It describes the various entities, their attributes, roles, and relationships. Selection of resources is determined either by a direct user instruction or by semantic analysis, which produces a single option. In one embodiment, the connections are established based on a level of certainty of the connection. In other words, "whatever is connected to whatever" is implemented last. However, a possibility of the correct connection is defined by the environment, which is configured (more or less) based on some objective criteria. If the semantic analysis produces several options (alternatives), the certain selection is postponed as shown above.

Each application in the scope of the invention should have its own set of resources described by a meta-language of the APS package. For activating the application successfully, in one embodiment, the provider presents a graph of resources of an application to a customer prior to starting resource provisioning procedure.

According to the exemplary embodiment, semantic links are used to determine which interconnected application resources need to be provisioned or satisfied based on the applications' business logic and requirements. Each provider has its own model of creation of hardware and software environments. This model can be different from the models of other providers in terms of technical implementation and methods of description. According to the exemplary embodiment, the provisioning system can integrate application interfaces with the resources and the interfaces of the provider, the interfaces and the resources available from other sources as well as the interfaces owned by the user According to one exemplary embodiment, the method uses description of connectors as "nodes," and functional interconnections between connectors as "links". The next step is junction of semantically corresponding nodes. Semantic analysis is performed based on semantic description of "new nodes" and "new links" connected to the "new node" directly or indirectly where weight factor depends on the description scope and distance of the connection (link).

Updating of semantic description and analysis is performed during the process of nodes junction since updating nodes' connections results in updates of semantic descriptions. The semantic analysis is performed for both required resources, for example, for user application being installed and for possible resource for connection. For example, if one connected resource requires additional resource absent in the system and another resource is more corresponding, but requires a resource already connected, the process chooses the second resource.

An intermediate graph is compiled where all the possible resources are taken into consideration and residual or "bad" resources are disconnected during several iterations or by analytic means.

In general, the resources and the connections can be matched by simple matching performed by administrator application. According to the exemplary embodiment, this process is simplified by semantic analysis of resources and requirements. In one embodiment, the user can generate group comments for the resource model. For example, some resources can be marked as the least expensive, as the most reliable, and the most popular.

The relevance of resource-to-resource or resource-to-provider relationships is estimated as a set of topics $\tau' \subseteq \tau$, containing in the description that includes some topic-related terms. All terms are ordered by their position in the description can correspond to several topics.

In the discussion below:
$l_i \in \omega$—one word description term,
$p_j \in \omega$—word combination found in the description,
$<l_i, \tau_k>$—a term $l_i$ connected with topic $\tau_k$,
$<p_j, \tau_k>$—a word combination term $p_j$ connected with topic $\tau_k$.

Then, relevance Rel of the topic $\tau_k$ can be estimated using the expression:

$$Rel(\tau_k) = \alpha_k \sum_{<l_i, \tau_k>} w(l_i) + \beta \sum_{<p_j, \tau_k>} w(p_j) \cdot |p_j|,$$

where $\alpha_k$ equals to power of $|\{\tau_k \in \tau | <l_i, \tau_k>\}|$—i.e., a number of different words in the description corresponding to a given topic, β—coefficient of importance of word combination expression or semantic expression, w(l$_i$)—weight of one word expression, w(p$_j$)—weight of a word combination expression, |p$_j$|—length of the word combination in expression—i.e., a number of words or letters in the expression.

The weights of semantic expressions are then calculated as:

$$w(t_i) = \frac{\gamma(l_i)}{|T_i|} \cdot \frac{1}{|Hom(l_i)|}, \; w(p_j) = \frac{\gamma(p_j)}{|T_j|} \cdot \frac{1}{|Hom(p_j)|},$$

where, γ—a function inversely proportional to a degree of expression's versatility;

T$_i$—a set of topics assigned to the expression in the dictionary or vocabulary;

Hom(x)—a set of expressions overlapping with the expression x (i.e., a number of homonyms or synonyms corresponding to x).

According to the above mathematical expressions, the weight of the expressions consists of a predefined part, which depends on vocabulary or thesaurus only, and a variable part, which depends on a contest of the description. The following coefficients are used:

$$\beta = 2, \; \gamma = \begin{cases} 1/5 - \text{universal term,} \\ 1 - \text{otherwise} \end{cases}$$

The values of these coefficients have been determined empirically and can vary depending on the contest of the description. Once the descriptions had been found relevant, the resources can be tested for connectability.

Figure 2:
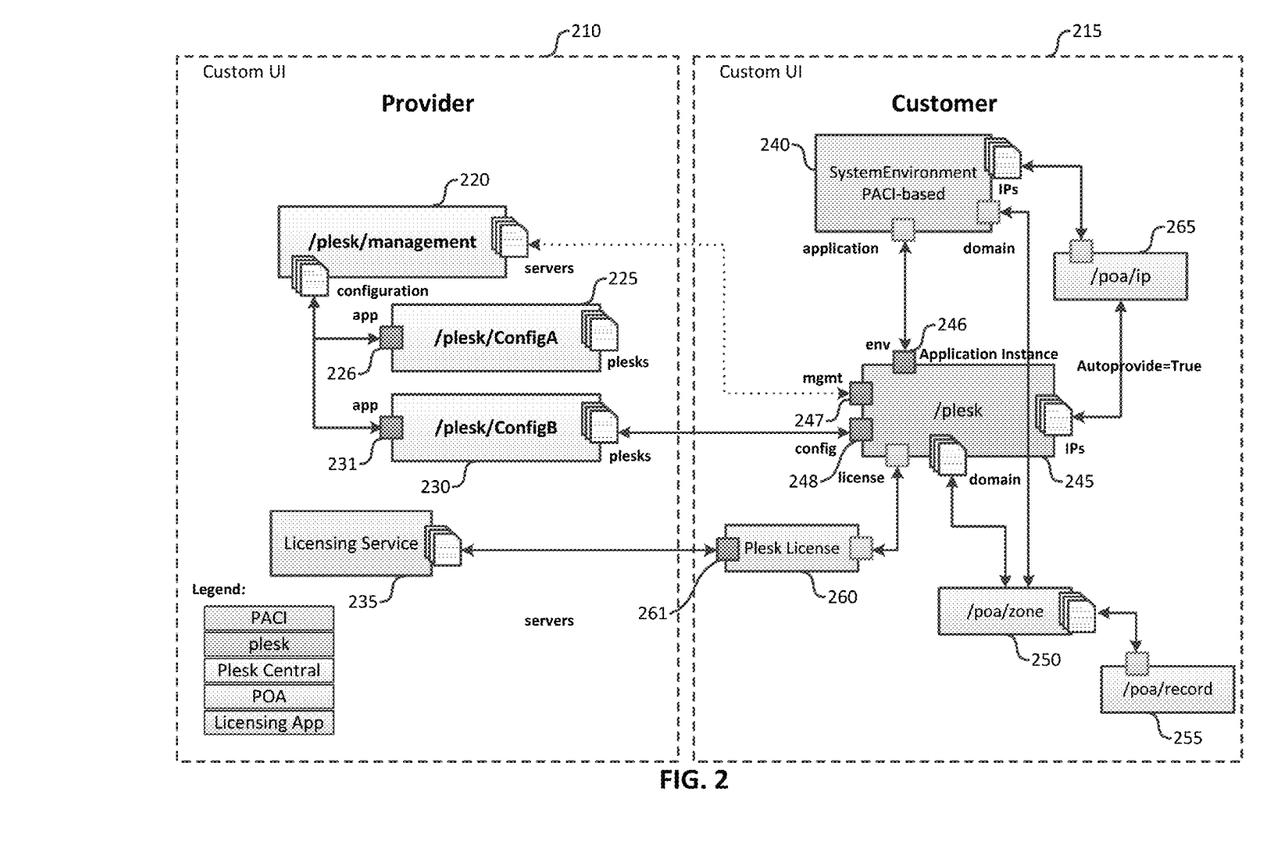
FIG. 2 illustrates a system implemented in a provider data center, in accordance with the exemplary embodiment.

FIG. 2 illustrates a system implemented in the provider datacenter, in accordance with the exemplary embodiment. The system is built based on a semantic analysis of a resource model upon installation of a user application instance. The system utilizes the following components (bottom left of the figure): PACI (Parallels Automation for Cloud Infrastructure) module, a PLESK instance, a PLESK Central (the PLESK provisioning utility), POA—Parallels Operation Automation system, and a licensing application module.

A system environment 240 is system services and configurations that support functionality of a user application. The system environment 240 can support Internet protocols, sets of applications, various types of business logic required for creation of user space. PLESK application instance 245 is an application or close set of applications, which provides control over shared hosting (or server) belonging to user. PLESK 245 can control the system environment 240. Another application used in the system is POA (Parallels Operation Automation) and a licensing application providing licensing of the PLESK application. The PLESK application is a service product, which has to be provided to the end user. Everything else is used to facilitate the PLESK service.

A POA/zone 250 provides services required by a certain application to user of Parallels Operation Automation. The white blocks in FIG. 2 show that connections are specifically described and do not require semantic parsing or analysis. The POA zone 250 has some POA records 255. The zone 250 should definitely have space for storing records, but if a user already has the records for connection and needs to connect it, the interface is attached to the zone 250. The record resources 255 are used when PLESK needs to set up mail hosting, so the customer records are kept. The records can include sub-users IDs, IDs of depending external resources, logins and passwords and etc. Another resource is POA IP address 265. The IP address can be assigned to a VM and the PLESK instance 245 can use it. The IP address can be bought by the customer 215 or it can be provided by the provider as a part of Parallels Operation Automation system (POA).

In order for the PLESK instance 245 to operate, it has to have a license 260. The provider 210 sets up a licensing service 235. In other words, the provider 210 buys PLESK licenses. The provider 210 uses PLESK management module 220 in order to set up configurations 225 and 230 of the PLESK application instance 245. This describes the interaction between resources and how the customer 215 receives an entire set of services and resources from the provider 210. The service template provided to the customer includes a PLESK Server application, PLESK configurations, Virtual Environment (VM or Container and specific OS and version, where applicable), DNS hosting and a PLESK license.

When the customer 215 buys the application for installation inside a data center, the provider 210 has to configure the application in such a way, that the user or customer 215 gets the ready-to-go application from the APS package. This is implemented by the application provisioning algorithm in accordance with the exemplary embodiment.

Initially, the APS package is provided for deployment and user preferences are used for configuring future installation. The APS package contains description of interfaces and requirements and the user can choose which previously generated data should be used with deployed application, which type of interface for communication is preferable, how the user prefers to communicate with the data center and with the application. In turn, a hosting provider also has preferences and requirements for the user and for the application. For example, a hosting provider requires a level of isolation of a user inside the data center, preferred antivirus software quotes and quote managing software, etc. All of these requirements may be described less or more formally and may have different level of necessity. The system selects a resource and corresponding description characterized either by direct description (for example, as a specific package of a specific software or by fuzzy semantic description—e.g., Internet Explorer-like interface.

In the example provided by FIG. 2, the connections required for semantic links are shown by blocks 226, 231, 246, 247, 248, 261 as well as white blocks. Based on these connections' descriptions, the provider 210 establishes access to respective resources for the customer 215. The access is granted based on connection (link) coincidence. According to the resource provisioning algorithm, the resource is placed in user space without starting the provisioning of this resource. Then, the required relationships (links to other resources) are tuned. The directly described resources are used as is and the corresponding connections are connected directly. When the dependency is not defined in a strict manner, or when it cannot be satisfied because the resource does not exist, the semantic analysis of the link is performed.

The PLESK provisioning is interrupted and the system goes into sub-procedure of provisioning the System Environment 240. Then, the System Environment 240 is created and its link 246 is satisfied. The provisioning of the System Environment 240 is started. Note that provisioning and creating relationships are implemented as direct API calls to particular applications by the APS controller. These API calls invoke provisioning of the certain resources. Note that the System Environment 240 is independent and does not have any required semantic links to the PLESK instance 245. In other words, the VM operation does not depend on the applications that run on it. However, the System Environment 240 must have a link to a configuration utility provided by PACI (Parallels Automation for Cloud Infrastructure) application.

After the resource provisioning is completed, the resource appears as an actual object which can be used. Note that the business logic of each of the resources is defined by the required semantic links to other resources. In the example depicted in FIG. 2, the IP address is not required by the System Environment 240 (i.e., the VM). Once the provisioning of the System Environment 240 is completed, the System Environment 240 is connected (i.e., notified), the system continues provisioning of PLESK operation. Once the provisioning is finished, the customer 215 has all the resources ready to be used.

According to the exemplary embodiment, the provisioning algorithm is implemented as a hierarchical tree. A root tree resource (object) is created. Then, all relationships (semantic links) are determined. The existing linked objects are found and not yet existing ones are determined. The tree branch is created not further than one link from a non-existing object. The leaf nodes of the tree are the existing objects or the objects that do not have the required links. Once the algorithm reaches the edge of the tree, it moves back to the root—i.e., implements provisioning of the tree nodes. Once the entire tree graph is provisioned, it can be provided to the customer to be used.

According to the exemplary embodiment, the PLESK provisioning method is implemented as following steps:
1. Create an application resource;
2. Satisfy configuration relationships;
3. Notify resources of a new semantic link;
4. Satisfy PLESK management relationships;
5. Notify about new link;
6. Provisioning of a System Environment (SE);
7. Create SE;
8. Satisfy the links for SE (normally there are no required links);
9. Provision SE;
10. Notify SE;
11. Provision PLESK.

Those skilled in the art will appreciate that the application to be provisioned is described as a set of resources (objects), with their semantic links reflecting the business logic of the application described by a meta-language. The links are semantic because they define the communication between the business objects within the application. When the provider creates a service template, he uses the semantic information provided by the applications business logic and by the user requirements. The provider, based on requirements of the user service agreement, creates a VM and provides the PLESK service of a required configuration with the license. If a user requires a proprietary resource, the system attempts to find it within all available applications. If the resource is not available through any of the applications, the system generates an error message.

Figure 3:
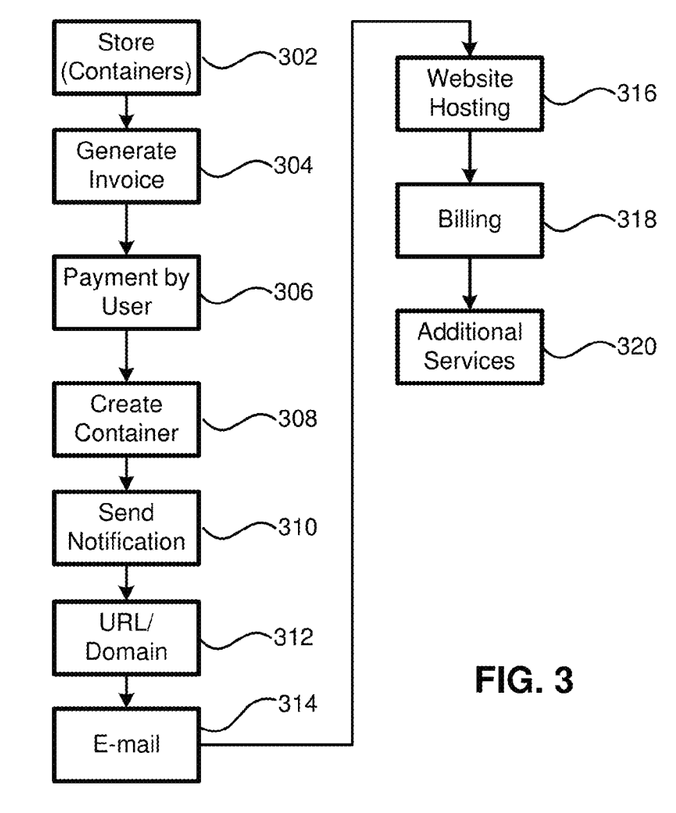
FIG. 3 illustrates a flowchart of a method for application testing, in accordance with the exemplary embodiment.

FIG. 3 illustrates a flowchart of a method, in accordance to the exemplary embodiment. In step 302, a store offers Virtual Containers for sale to a user. A user selects a Container and a special component generates an invoice in step 304. In step 306, user pays for the invoice. In step 308, a special component addresses a system for creating the Container (e.g., Virtuozzo™). In step 310, a special component sends notification to the user indication that the Container is ready. In step 312, a URL or IP address for container modification is provided to the user. In step 314, an email for the user where he can receive Container-related data is created. In step 316, a web hosting is provided for using the Container on a web site(s). Billing of the user is implemented in step 318 after a certain time period (e.g., a month). Additional services are provided in step 320.

For example, some of newly connected resources require connection to MySQL server and one resource requires connection to another database. Thus, a connection to MySQL for a group of resources is created inside the configured user space, for example. Meanwhile, an external connection is created for one unique resource. In one embodiment, if the unique resource is connected first, it is replaced by a generic resource, which requires connection to MySQL. Note that FIG. 3 illustrates a very basic (minimal) scenario of a product deployment and sale. Other steps can be included as well. For example, a user points to a critical shortcoming of a resource model and the process is repeated using a priority set by the user.

Figure 4:
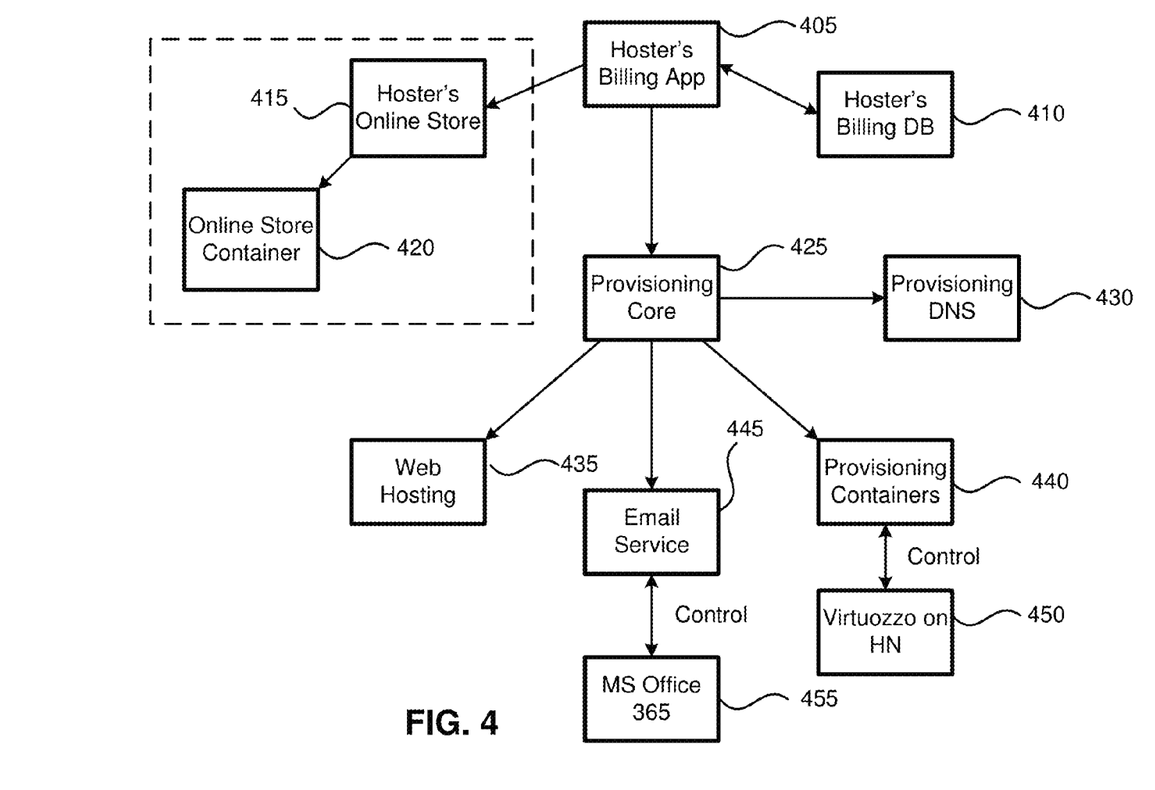
FIG. 4 illustrates system architecture for application testing and provisioning, in accordance with the exemplary embodiment.

A system for implementing a scenario depicted in FIG. 3 is illustrated in FIG. 4. According to the exemplary embodiment, a system includes hoster's billing application 405. The hoster's billing application 405 uses a database 410. A provisioning core module 425 receives requests (i.e., for example, a container subscription request) from the hoster's billing application 405. Provisioning core module 425 has sub-modules: 430—for provisioning DNS (system's own DNS or DNS's for sale), 440—for provisioning Containers, 435—for web hosting, 445—for email service. The Containers provisioning module 440 can use Virtuozzo™ module 450 on a hardware node, for example. The email service module 445 can use MS Office 365 server 455 located on a cloud.

The containers 420 available for sale to a user are located in a hoster's online store 415. Note that provider controls a hardware node (Virtuozzo™) from this system. As shown in FIG. 4, the system has multiple interconnected components. In order to test this system, the components have to be connected, configured and deployed in a particular order based on required configuration.

For example, some users may not need web hosting or email service, etc. Most typical configurations include a database, statistics module and malware protection. Less typical configurations for the application have a set of redirection procedures. Some components can be included together into a Container or a Virtual Machine, while other components can be placed on the hardware node. In other words, customization and different levels of virtualization can be implemented. According to the exemplary embodiment, the system testing is performed based on hoster configuration requirements. Note that a basic, typical most popular configuration is tested. For example, a hoster may not want to use a billing module or a stored module provided as a standard module, in favor of his own components. In other words, the container can have a provider's (vendor's) native modules as well as user's (i.e., a hoster-provided) own modules. According to the exemplary embodiment, testing provides for scalability and workability of the configured system. This enhances the operating speed and accessibility of the servers.

According to the exemplary embodiment, a special format and description of a final product is used. The format is an APS format, which contains a description of connections and packaging format of the description of the application.

Additionally, a number of optional configurations can be used such as enhanced security, extended interface, and code customization (provided to third-parties). In other words, there are ready-to-use basic configurations and the customized configurations that can be produced. For example, a number of versions (for different OS versions) of the online store 415 exist. For the purpose of testing, one of these versions is used. The version of the online store has to be compatible with the version of the product. In one embodiment, a new version of application is inserted into a tested configuration where the previous version worked well. If a conflict occurs, the links are checked by switching off the links causing the failure one by one. If a conflict resolution is found, the semantic model is updated by application of semantic updates.

The system can build the product based on the format and description indicating what OS is used, what type of container, what online store, what billing module, what security roles, etc.

APS package developer can define access rights for the following roles:

Resource Owner is a user or an account of the system that owns this APS resource.

The role is assigned in the following cases:

During provisioning, the ownership is assigned by the provisioning system. If an organization subscribes to a resource, the organization (account) will be the owner of the resource. When a resource (e.g., mailbox) is created for a user, the user will be the owner of the resource.

When an account administrator creates a resource, the account will be the owner of the resource. When an end-user creates a resource, this user will be the owner of the resource.

Resource Referrer is a user or an account of the system that has an APS link (relation) to the APS resource, but does not own it. For example, if a link is created between a user and a virtual server, the user will be a referrer of the server, and the server will be a referrer of the user.

Figure 5:
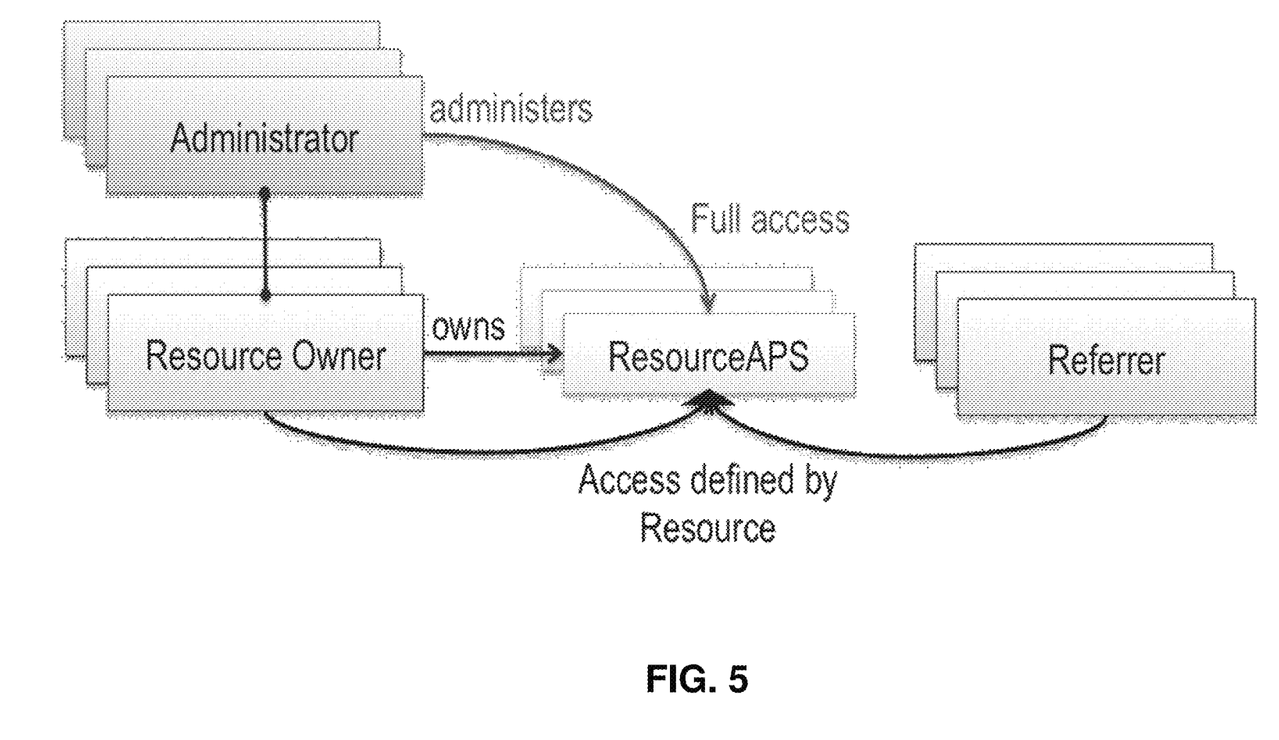
FIG. 5 illustrates access in an APS (Application Packaging Standard) package.

Administrator (account) of a resource owner is an administrator of the resource. For example, if a customer account is created by a reseller account, the reseller is the administrator of this customer. The resource administrator role always has a full access to the APS Resource. For the others, the access is defined in the APS package as shown in FIG. 5.

Figure 6:
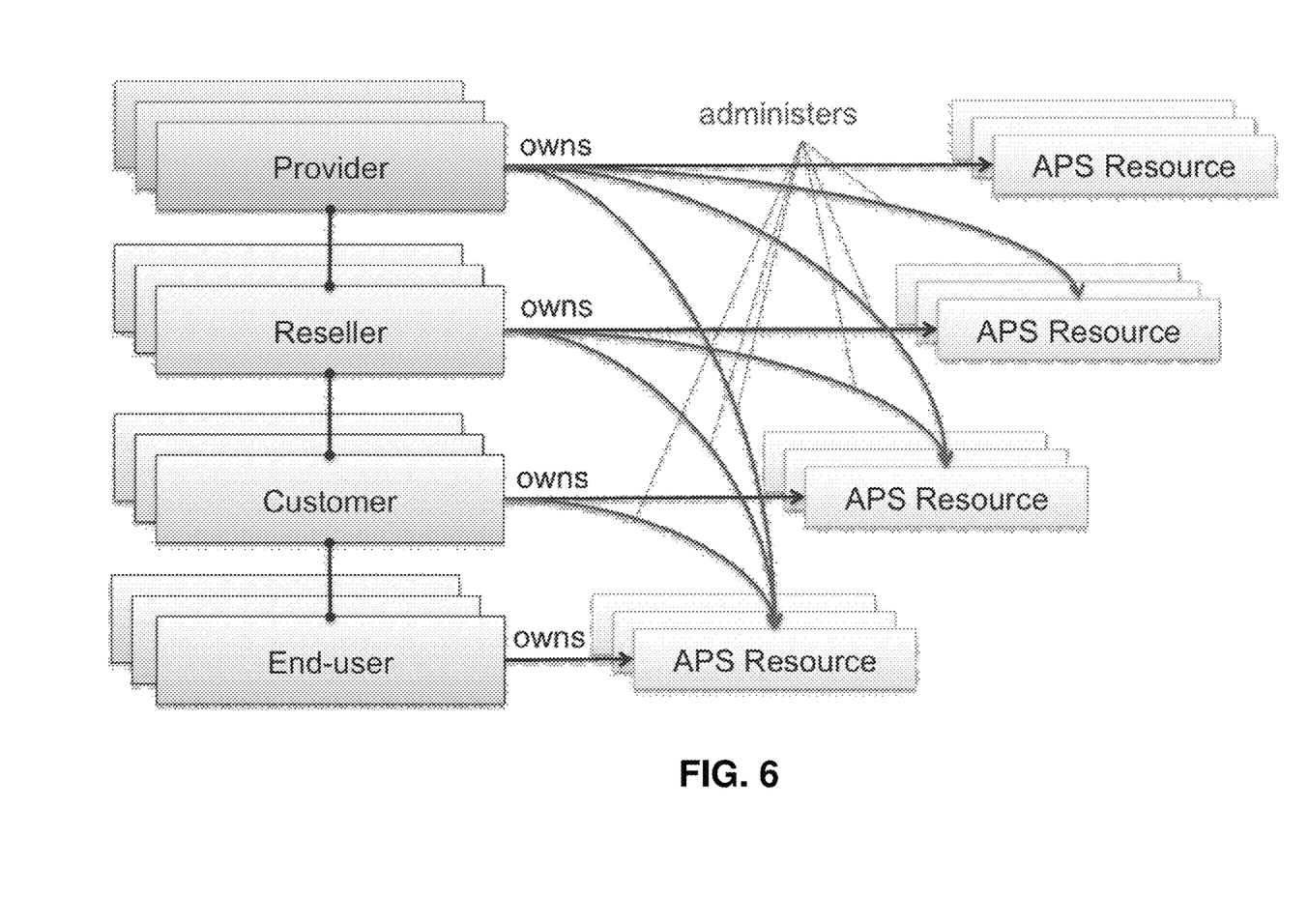
FIG. 6 illustrates resource access hierarchy.

In a hosting system, these rules usually work recursively—i.e., the administrator of the administrator also has a full access to the resources below in the hierarchy depicted in FIG. 6.

According to the exemplary embodiment, the system is built according to user (i.e., the hoster) configuration requirements. For example, the hoster specifies a number of users and other preferences, and the system determines optimal component set and configuration for these requirements. The determination is made by description of connections (links). For example, the connection is provided only by a certain application and only for control of large volumes of disks space and for high volume of traffic. In one embodiment, provider or hoster can configure the connections (links) by analyzing the reliability of the connection.

However, testing can be performed using basic configuration of the product. Note that the deployment script uses some default configurations. For example, a system can handle 100,000 users and the default configurations are set for this number of users. According to the exemplary embodiment, the results of pervious tests are taken into consideration for the default configuration of a new version of the product. If the configuration is tested and deemed appropriate for a new version, the new version is considered to be compatible. The users (testers) can order installation of a particular test configuration on a test cluster. The desired configuration is installed in a short time (e.g., from half an hour to a several hours depending on the configuration).

The users (i.e., testers) can select a configuration via a special service and order installation of this configuration on their test cluster. Then, the users can perform automated or manual testing of the product with a given configuration.

According to the exemplary embodiment, the provisioning is implemented as a two phase (i.e.,—a two-pass) process. The first pass determines the application configuration to be provisioned. In one embodiment, the application is separated into a set of resources and the resources are provisioned based on the required configuration. In one embodiment, the first pass determines the connections that can be created directly or the ones that have a preferred configuration. The subsequent pass (i.e., one and a half pass) determines a possibility of connecting the resources that were not connected due to indefinite nature. The second pass checks resource model of the first configuration. Then, a possibility of increasing a number of resources is checked and the resource model is updated. The resources that cannot be selected automatically are connected manually.

Figure 7:
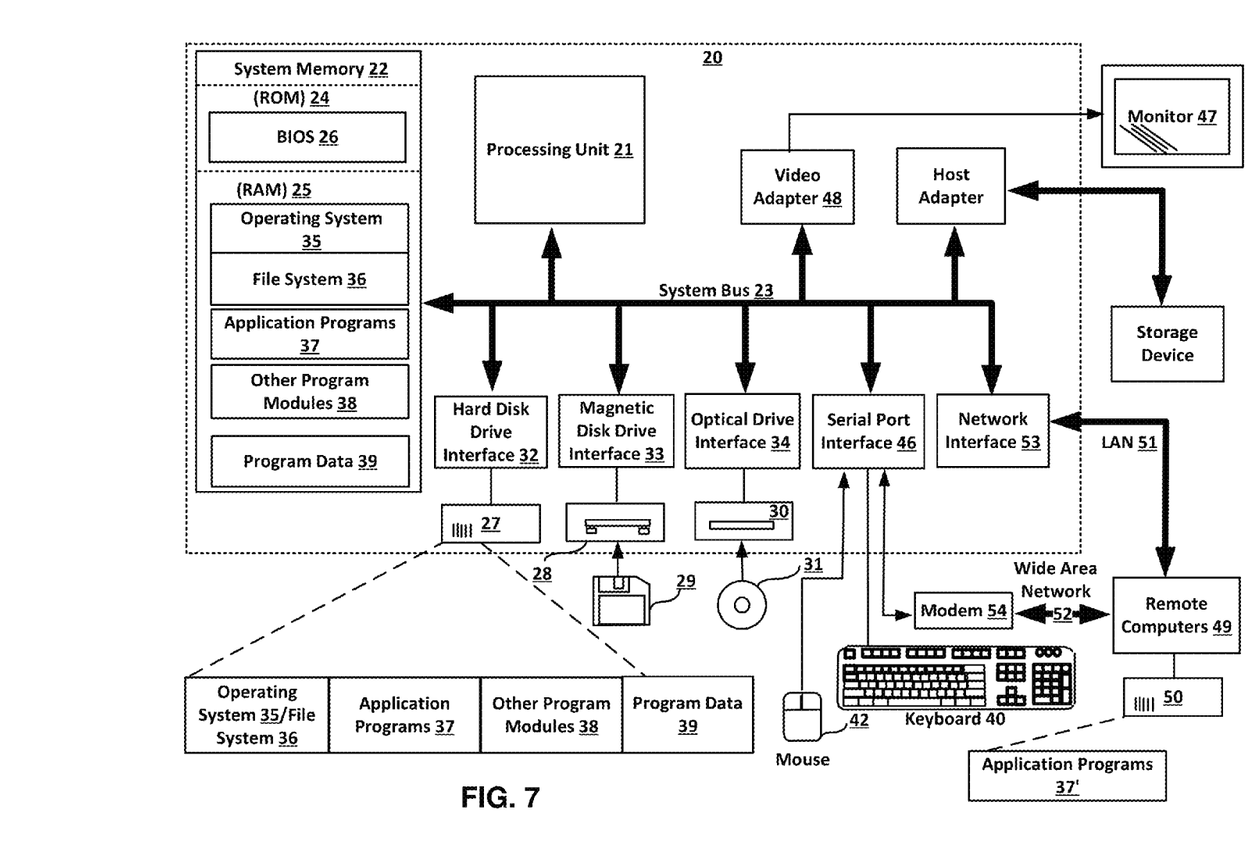
FIG. 7 illustrates a schematic of an exemplary computer system that can be used for implementation of the invention.

With reference to FIG. 7, an exemplary system for implementing the invention includes a general purpose computing device in the form of a computer system 20 or the like including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 104, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention. The invention is further defined by the following claims.

What is claimed is:

1. A computer-implemented method for an automated provisioning of application into a service infrastructure, wherein the application business logic contains connectors semantically described by requirements of service infrastructure resources, the method comprising:
   dividing an application into multiple resources based on a business logic of the application;
   semantically describing connectors of the service infrastructure;
   semantically describing resources of the application and resources of the service infrastructure;
   performing semantic analysis based on semantic description of connectors and resources connected to each connector directly or indirectly, where a connection weight factor depends on a distance to the connector, and
   wherein the connectors include protection nodes for filtering network traffic between the application resources and the resources of the service infrastructure;
   building a domain model based on topology of the service infrastructure and network distance between the resources of the application and the resources of the service infrastructure, so as to satisfy the requirements of the application business logic by performing steps a)-g) as follows:
   a) detecting semantically coincident connectors of the application and of the service infrastructure;
   b) connecting the most coincident connectors of the application and connectors the service infrastructure;
   c) updating semantic description of remaining connectors using semantic description of the application and resources of the service infrastructure associated with the rest of connectors;
   d) repeating the steps a)-c) in view of changes of semantic descriptions of the connectors to ensure that all the connectors have connections;
   e) once all the connectors have connections, checking workability of the domain model; and
   f) in an unworkable domain model, detecting connections that result in failed workability of the domain model and repeating steps a)-e) until a workable domain model is obtained; and
   g) implementing the workable domain model to integrate the application into the service infrastructure.

2. The method of claim 1, wherein the nodes are connected to other nodes using links.

3. The method of claim 2, wherein the more links are placed between the nodes, the less important are the relationships between these nodes.

4. The method of claim 3, wherein semantic analysis is performed based on a semantic description of new nodes and new links connected to the new node, wherein a weight factor of the relationships depends on a description scope and distance of the link.

5. The method of claim 1, wherein a provisioning algorithm for the resources is implemented as a hierarchical tree having the resources as tree leaves.

6. The method of claim 1, further comprising generating a graph of resources of an application for a customer prior to starting the resource provisioning.

7. The method of claim 1, wherein at least some connectors represent nodes disconnected from any resources.

8. A system for an automated provisioning of application into a service infrastructure, wherein the application business logic contains connectors
   semantically described by requirements of service infrastructure resources, the system comprising:
      a processor and memory storing code for executing on the processor, the code implementing an application divided into multiple resources based on a business logic of the application;
      semantically described connectors of a service infrastructure;
      semantically described resources of the application and resources of the service infrastructure,
      wherein the connectors include protection nodes for filtering network traffic between the application resources and the resources of the service infrastructure;
      a domain model based on topology of the service infrastructure and network distance between the resources of the application and the resources of the service infrastructure, so as to satisfy the requirements of the application business logic by performing steps a)-g) as follows:
a) detecting semantically coincident connectors of the application and of the service infrastructure;
b) connecting the most coincident connectors of the application and connectors the service infrastructure;
c) updating semantic description of remaining connectors using semantic description of the application and resources of the service infrastructure associated with the rest of connectors;
d) repeating the steps a)-c) in view of changes of semantic descriptions of the connectors to ensure that all the connectors have connections;
e) once all the connectors have connections, checking workability of the domain model; and
f) in an unworkable domain model, detecting connections that result in failed workability of the domain model and repeating steps a)-e) until a workable domain model is obtained; and
g) implementing the workable domain model to integrate the application into the service infrastructure,
wherein steps a)-g) are also based on a semantic analysis based on semantic description of connectors and resources connected to each connector directly or indirectly, where a connection weight factor depends on a distance to the connector.

9. The system of claim 8, wherein the nodes are connected to other nodes using links.

10. The system of claim 9, wherein the more links are placed between the nodes, the less important are the relationships between these nodes.

11. The system of claim 10, wherein semantic analysis is performed based on a semantic description of new nodes and new links connected to the new node, wherein a weight factor of the relationships depends on a description scope and distance of the link.

12. The system of claim 8, wherein a provisioning algorithm for the resources is implemented as a hierarchical tree having the resources as tree leaves.

13. The system of claim 8, further comprising generating a graph of the resources of an application for a customer prior to starting the resource provisioning.

14. The system of claim 8, wherein at least some connectors represent nodes disconnected from any resources.

* * * * *